United States Patent [19]

Weder et al.

[11] Patent Number: 5,111,613

[45] Date of Patent: * May 12, 1992

[54] PLEATED FLOWER POT OR FLOWER POT COVER

[75] Inventors: Donald E. Weder; Joseph G. Straeter, both of Highland, Ill.

[73] Assignee: Highland Supply Corporation, Highland, Ill.

[*] Notice: The portion of the term of this patent subsequent to Sep. 27, 2005 has been disclaimed.

[21] Appl. No.: 366,588

[22] Filed: Jun. 15, 1989

Related U.S. Application Data

[63] Continuation-in-part of Ser. No. 219,083, Jul. 13, 1988, Pat. No. 4,897,031, which is a continuation of Ser. No. 4,275, Jan. 5, 1987, Pat. No. 4,773,182, Continuation of Ser. No. 613,080, May 22, 1984, abandoned.

[51] Int. Cl.$^5$ .............................................. A01G 9/02
[52] U.S. Cl. ...................................................... 47/72
[58] Field of Search .................. 47/66, 72; 229/87.01, 229/87.03, DIG. 3; 206/423; 383/104, 120

[56] References Cited

U.S. PATENT DOCUMENTS

| | | | |
|---|---|---|---|
| D. 254,659 | 4/1980 | Karotseris | D11/143 |
| D. 292,562 | 11/1987 | Weder et al. | D11/164 |
| D. 292,563 | 11/1987 | Weder et al. | D11/164 |
| D. 293,224 | 12/1987 | Weder et al. | D11/164 |
| D. 293,774 | 1/1988 | Weder et al. | D11/164 |
| D. 293,775 | 1/1988 | Weder et al. | D11/164 |
| 239,987 | 4/1881 | Shellenberger . | |
| 716,668 | 12/1902 | Cheney . | |
| 732,889 | 7/1903 | Paver . | |
| 923,663 | 6/1909 | Kroeger . | |
| 1,002,346 | 9/1911 | Weeks . | |
| 1,052,379 | 2/1913 | Ranken . | |
| 1,069,675 | 8/1913 | Claussen . | |
| 1,206,708 | 11/1916 | Hutchins . | |
| 1,421,027 | 6/1922 | Reynolds . | |
| 1,421,628 | 7/1922 | Watkins . | |
| 1,446,563 | 2/1923 | Hughes . | |
| 1,693,435 | 11/1928 | Clarke . | |
| 1,863,216 | 6/1932 | Wordingham . | |
| 1,868,853 | 7/1932 | Sievers . | |
| 1,920,533 | 8/1933 | Strauss | 281/34 |
| 1,924,926 | 8/1933 | Gray | 65/53 |
| 1,951,642 | 3/1934 | Augustin et al. | 47/34 |
| 1,978,631 | 10/1934 | Herrlinger | 91/68 |
| 1,979,771 | 11/1934 | Potter | 47/41 |
| 2,076,212 | 4/1937 | Suter et al. | 91/67.9 |
| 2,123,075 | 7/1938 | Langa | 47/34 |
| 2,152,648 | 4/1939 | Jones | 47/34 |
| 2,278,673 | 4/1942 | Savada et al. | 154/43 |
| 2,302,259 | 11/1942 | Rothfuss | 41/10 |
| 2,355,559 | 8/1944 | Renner | 229/8 |
| 2,411,328 | 11/1946 | MacNab | 33/12 |
| 2,482,981 | 9/1949 | Kamrass | 41/13 |
| 2,510,120 | 6/1950 | Leander | 117/122 |
| 2,529,060 | 11/1950 | Trillich | 117/68.5 |
| 2,586,078 | 2/1952 | O'Malley | 229/87.03 |
| 2,774,187 | 12/1956 | Smithers | 47/41 |
| 2,822,287 | 2/1958 | Avery | 117/14 |
| 2,827,217 | 3/1958 | Clement | 229/1.5 |

(List continued on next page.)

FOREIGN PATENT DOCUMENTS 163453  8/1985  European Pat. Off. .
2948265  5/1981  Fed. Rep. of Germany .

(List continued on next page.)

OTHER PUBLICATIONS

Exhibit A. Curtis Wagner Co., Inc., Houston Tex., shows thick, stiff shiny red plastic pot cover with large scalloped border, (Photograph) Date unknown.

(List continued on next page.)

*Primary Examiner*—David A. Scherbel
*Assistant Examiner*—Michele A. Van Patten
*Attorney, Agent, or Firm*—Dunlap, Codding & Lee

[57] ABSTRACT

A flower pot or flower pot cover comprising a base and a skirt connected to an upper end of the base. The base includes a plurality of overlapping folds for providing structural integrity. The skirt includes a plurality of folds which are not connected to provide an overall pleated appearance. In other embodiments, the folds in the skirt can be partially or completely connected.

20 Claims, 1 Drawing Sheet

U.S PATENT DOCUMENTS

| | | | |
|---|---|---|---|
| 2,845,735 | 8/1958 | Werner | 41/10 |
| 2,942,823 | 6/1960 | Chapman | 248/97 |
| 2,967,652 | 1/1961 | Canfield | 229/5.5 |
| 3,013,689 | 12/1961 | Shropshire | 215/100.5 |
| 3,022,605 | 2/1962 | Reynolds | 47/58 |
| 3,094,810 | 6/1963 | Kaplin | 47/37 |
| 3,130,113 | 4/1964 | Silman | 161/97 |
| 3,271,922 | 9/1966 | Wallerstein et al. | 53/3 |
| 3,376,666 | 4/1968 | Leonard | 47/11 |
| 3,488,022 | 1/1970 | Vittori | 248/152 |
| 3,552,059 | 1/1971 | Moore | 47/41.12 |
| 3,554,434 | 1/1971 | Anderson | 229/55 |
| 3,620,366 | 11/1971 | Parkinson | 206/59 C |
| 3,681,105 | 8/1972 | Milutin et al. | 117/15 |
| 3,775,903 | 12/1973 | Pike | 47/37 |
| 3,869,828 | 3/1975 | Matsumoto | 47/34.11 |
| 3,962,503 | 6/1976 | Crawford | 428/40 |
| 3,974,960 | 8/1976 | Mitchell | 229/62 |
| 4,043,077 | 8/1977 | Stonehocker | 47/66 |
| 4,054,697 | 10/1977 | Reed et al. | 428/40 |
| 4,096,987 | 6/1978 | Rodish | 383/120 |
| 4,118,890 | 10/1978 | Shore | 47/28 R |
| 4,170,618 | 10/1979 | Adams | 264/101 |
| 4,216,620 | 8/1980 | Weder et al. | 47/72 |
| 4,250,664 | 2/1981 | Remke | 47/76 |
| 4,283,032 | 8/1981 | Smith | 248/97 |
| 4,297,811 | 11/1981 | Weder | 47/72 |
| 4,300,312 | 11/1981 | Weder et al. | 47/72 |
| 4,304,579 | 12/1981 | Granville et al. | 383/120 |
| 4,338,979 | 7/1982 | Dow | 141/10 |
| 4,340,146 | 7/1982 | Stratton | 215/100.5 |
| 4,380,564 | 4/1983 | Cancio et al. | 428/167 |
| 4,400,910 | 8/1983 | Koudstaal et al. | 47/84 |
| 4,413,725 | 11/1983 | Bruno et al. | 206/45.33 |
| 4,488,697 | 12/1984 | Garvey | 248/101 |
| 4,508,223 | 4/1985 | Catrambone | 206/423 |
| 4,621,733 | 11/1986 | Harris | 206/423 |
| 4,717,262 | 1/1988 | Roen et al. | 383/120 |
| 4,733,521 | 3/1988 | Weder et al. | 53/580 |
| 4,773,182 | 9/1988 | Weder et al. | 47/72 |
| 4,795,601 | 1/1989 | Cheng | 264/138 |
| 4,835,834 | 6/1989 | Weder et al. | 29/525 |

FOREIGN PATENT DOCUMENTS

| | | |
|---|---|---|
| 2036163 | 12/1970 | France . |
| 2272914 | 1/1976 | France . |
| 2489126 | 8/1980 | France . |
| 8101464 | 10/1982 | Netherlands . |
| 161005 | 6/1933 | Switzerland . |
| 274167 | 3/1951 | Switzerland . |
| 560532 | 9/1972 | Switzerland . |
| 28130 | 9/1907 | United Kingdom . |
| 1204647 | 9/1970 | United Kingdom . |

OTHER PUBLICATIONS

Exhibit B. Jacobson Pot Cover Company of Scranton, Pa. advertising literature, date of first use unknown.

Exhibit C. Photograph of pot cover, manufacturer unknown, but very similar to #C21 on Exhibit B (Jacobson literature).

Exhibit D. Photocopy of photo of pot cover ("Platform Pot Dresser") made by John Raisen Corp., San Francisco, Calif., date of first use unknown.

Exhibit E. Photograph of 2-part pot cover system made by Floral Decor, subsidiary of John Henry Co., Lansing, Mich.

Exhibit F. Photo of pot cover made by a Holland company (K.P.I.), date of first public use believed to be late 1984.

Exhibit G. "The Glass of Frederick Carder", copyright 1971 by P. V. Gardner, showing various styles of glass basket-like vases or containers.

Exhibit H. "Speed Cover ®" brochure, published in 1983 by Applicants, showing various pot covers for sale.

Exhibit I. "Speed Cover ®" brochure, published in 1983 by Applicants, showing various pot covers for sale.

Exhibit J. Item published in 1936 by Gellman Bros., Minneapolis, Minn., shows an assortment of paper hats.

Exhibit K. Photo of various other flower pot wrappings, sold in rolls or sheets and used in the floral industry for years.

Exhibit L. Photo of pot cover made of woven straw--like material.

Exhibit M. Photo of basket-type pot cover used in the floral industry.

Exhibit N. "Speed Cover ®" brochure, published in 1984 by Applicants, showing various pot covers for sale.

It is also known to shape a sheet of shape-sustaining wrapping material, such as foil, to a pot using a board with a central hole, the diameter being greater than the diameter of the pot, by pushing the pot through the hole pulling the wrapping through the hole so that the wrapping is gathered around the pot.

PLEATED FLOWER POT OR FLOWER POT COVER

CROSS REFERENCED TO RELATED APPLICATIONS

The present invention is a continuation-in-part of co-pending patent application entitled "ARTICLE FORMING SYSTEM", U.S. Ser. No. 219,083, filed Jul. 13, 1988, now U.S. Pat. No. 4,897,031, issued Jan. 30, 1990, which is a continuation of U.S. Ser. No. 004,275, filed Jan. 5, 1987, now U.S. Pat. No. 4,773,182, issued Sep. 27, 1988, entitled "ARTICLE FORMING SYSTEM", which is a continuation of U.S. Ser. No. 613,080, entitled "ARTICLE FORMING SYSTEM", now abandoned. The disclosures in both of these specifically are incorporated hereby by reference; and design patent application entitled "FLOWER POT COVER" filed on even date herewith, U.S. Ser. No. 367,098. This application also relates to design patent application entitled, "FLOWER POT COVER", U.S. Ser. No. 411,247, filed Sep. 22, 1989, which is a continuation of U.S. Ser. No. 283, 014, filed Dec. 8, 1988, now abandoned, which is a continuation of design patent application entitled, "FLOWER POT COVER", U.S. Ser. No. 652,903, filed Sep. 21, 1984, now abandoned; and continuation-in-part of U.S. Pat. No. 293,224, issued Dec. 15, 1987. Related subject matter is disclosed in the co-pending applications: U.S. Ser. No. 693,906, filed May 1, 1991, entitled, "FLOWER POT OR FLOWER POT COVER WITH PLEATED SKIRT AND OR BASE", U.S. Ser. No. (not yet known), entitled, "FLOWER POT OR FLOWER POT COVER WITH BASE HAVING OVERLAPPING FOLD SOME OF WHICH ARE CONNECTED AND SOME OF WHICH ARE UNCONNECTED"; U.S. Ser. No. 701,546, filed May 16, 1991, entitled, "FLOWER POT OR FLOWER POT COVER WITH PLEATED BASE"; U.S. Ser. No. 397,144, filed Aug. 22, 1989, entitled, "FLOWER POT OR FLOWER POT COVER WITH PLEATED SKIRT AND OR BASE", issue fee paid Apr. 12, 1991; U.S. Ser. No. 422,653, filed Oct. 17, 1989, entitled, "FLOWER POT OR FLOWER POT COVER WITH CONTROLLED PLEATS".

The present invention also relates to a flower pot or a flower pot cover having a skirt with folds in the skirt wherein the folds are connected generally at the outer peripheral surface of the skirt and/or at a position generally near the connection of the skirt to the base of the flower pot or flower pot cover or wherein a substantial portion of the folds in the skirt are permanently fixed.

DESCRIPTION OF THE PREFERRED EMBODIMENTS

Figure 1:
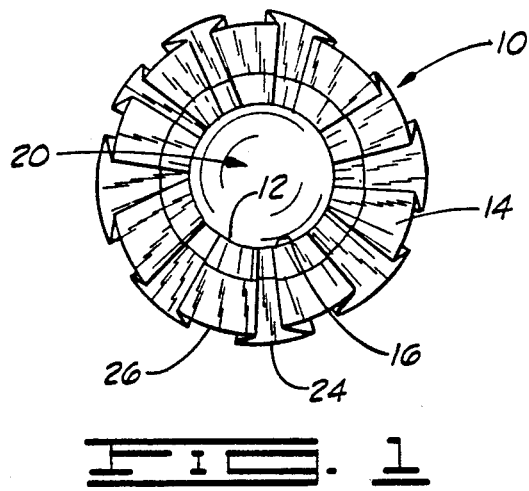
FIG. 1 is a top elevational view of the flower pot or flower pot cover of FIG. 1.
Figure 2:
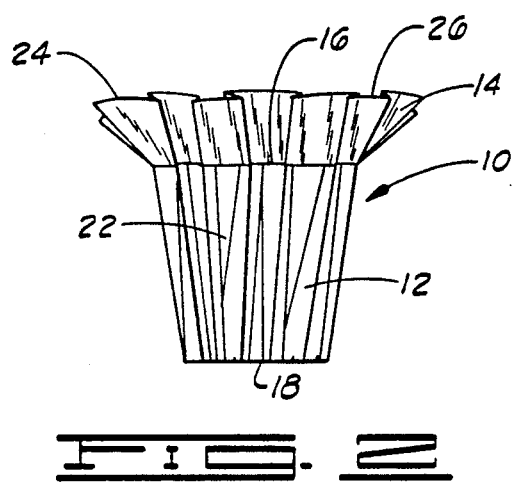
FIG. 2 is a side elevational view of the flower pot or flower pot cover constructed in accordance with the present invention.
Figure 3:
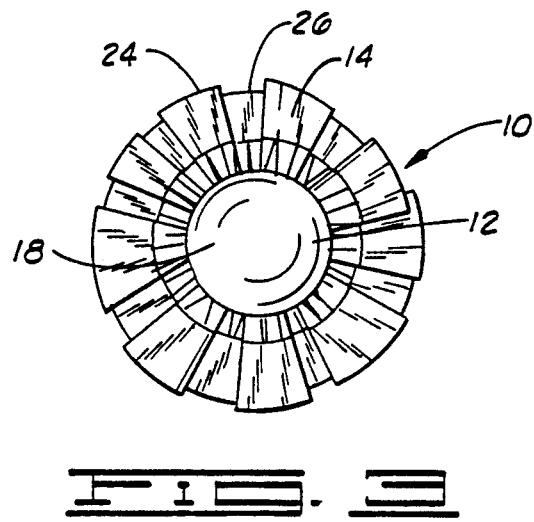
FIG. 3 is a bottom elevational view of the flower pot or flower pot cover of FIG. 1.

Shown in FIG. 1, 2 and 3 and designated therein by the reference numeral 10 is a flower pot or flower pot cover constructed in accordance with the present invention. In one embodiment, the article shown in the drawings is a flower pot cover which adapted for providing a decorative cover for a flower pot. In one other embodiment, the article shown in the drawings is a flower pot which is adapted to support floral groupings (defined below) in a manner well known in the art.

The flower pot or flower pot cover 10 comprises a base 12 and a skirt 14.

The base 12 has an upper end 16 and a lower end 18. An object opening 20 (FIG. 1) is formed through the upper end 16 and the object opening 20 extends a distance through the base 12 with the base 12 substantially encompassing the object opening 20 except for the open upper end 16 of the base 12.

The base 12 has a plurality of overlapping folds 22 (only one of the overlapping fold 22 being specifically designated by a reference numeral in FIG. 2) which extend at various angles and which have different and various lengths. The overlapping folds 22 in a preferred form are substantially fixed or connected. The overlapping folds 22 cooperate to provide structural integrity for maintaining the preformed shape of the base 12.

The skirt 14 is connected to the upper end 16 of the base 12. Preferably, the skirt 14 is formed integrally with the base 12. The skirt 14 extends outwardly from the upper end 16 of the base 12 terminating with an outer peripheral surface 24. A plurality of folds 26 (only one of the folds 26 being designated with a reference numeral in drawings 1 are formed in the skirt 14. Each of the folds 26 extends generally from the upper end 16 of the base 12 outwardly toward the outer peripheral surface 24 of the skirt 14.

In one embodiment, a substantial portion of the folds 26 are unconnected to provide an overall pleated appearance to the flower pot cover or flower pot 10. In one other embodiment of the present invention, a substantial portion of the folds 26 in the skirt 14 are connected or permanently fixed. In an other embodiment in the present invention, a substantial portion of the folds 26 in the skirt 14 generally near the outer peripheral surface 24 are fixed. In another embodiment of the present invention, a substantial portion of the folds 26 generally near and extending a distance from the upper end 16 of the base 12 are connected or substantially permanently fixed. The folds 26 in the skirt 14 may include combinations of the foregoing for the purpose of providing different overall appearances to the flower pot or flower pot cover 10.

In a preferred form, the flower pot or flower pot cover 10 is preformed from a sheet of material in a manner substantially like that described in the patent entitled "Article Forming System", U.S. Pat. No. 4,773,182, issued on Sep. 27, 1988 and in the co-pending continuation patent application entitled "Article Forming System", U.S. Ser. No. 219,083, filed Jul. 13, 1988, referred to before. Since the disclosures in this patent and patent application have been incorporated herein by reference, no further description of the forming of the flower pot or flower pot cover 10 is deemed necessary herein.

The flower pot or flower pot cover 10 may be constructed of a material selected from a group of materials consisting of a man-made organic polymer film, paper (treated or untreated or combinations thereof), burlap, cloth (natural or synthetic or combinations thereof), denim, foil, cling wrap, or cellophane or combinations thereof.

In one preferred embodiment, the flower pot or flower pot cover 10 is constructed from a relatively thin film of substantially non-shape sustaining man-made organic polymer film. The term "man-made organic polymer film" as used herein means a man-made resin such as a polyproplyene as opposed to naturally occurring resins such as cellophane. A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping.

Additionally a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention.

The flower pot or flower pot cover 10 may be constructed of a single layer of material or a plurality of layers of the same or different types of material. The flower pot or flower pot cover 10 may have any thickness. In one preferred embodiment, the flower pot or flower pot cover 10 is constructed from two polypropylyene films laminated together (a 20"×15" sheet of Mobil 270 ABW white opaque film laminated to a 20"×15" sheet of Mobil 220 AB clear film). The flower pot or flower pot cover 10 preferably has a thickness in a range of from less than about 1.0 mil to about 2.5 mils, although the thickness of the flower pot or flower pot cover 10 may be in a range from less than about 1.0 mil to about 30 mils and preferably the thickness is less than about 6 mils.

The term "cling wrap" as used herein may be any material which is capable of connecting to flower pot 10 and/or itself upon contacting engagement and is wrappable about flower pot 10 whereby portions of the cling wrap contactingly engage and connect to other portions of the cling wrap and/or the flower pot 10 for generally securing the sheet of material 32 wrapped about at least a portion of the flower pot 10. This connecting engagement is generally temporary in that the cling wrap material may be easily removed without tearing same. Preferably the cling wrap material is constructed and treated if necessary, from polyethylene such as Cling Wrap made by Glad®, First Brands Corporation, Danbury, Conn. Generally, the cling wrap material will range in thickness from less than about 0.2 mils to about 10 mils, and preferably less than about 0.5 mils to about 2.5 mils and most preferably from less than about 0.6 mils to about 2 mils. However, any thickness of cling wrap material may be utilized in accordance with the present invention which permits the cling material to function as previously described.

In a preferred form, a decorative pattern is formed or printed or embossed or otherwise disposed on or incorporated in the outer peripheral surface of the flower pot or flower pot cover 10. The term "decorative pattern" as used herein means a color and/or an embossed pattern and/or other decorative surface ornamentation, including, but not limited to printed designs, coatings, flocking or metallic finishes. The flower pot or flower pot cover 10 may be constructed of a sheet of material which is totally or partially clear or tinted transparent material. It also should be noted that a decorative pattern may be incorporated on the interior surface of the base 12 formed by the object opening 20 which may be desired in some applications.

Changes may be made in the construction of the flower pot or flower pot cover 10 as described herein without departing from the spirit and scope of the invention as defined in the following claims.

What is claimed is:

1. A flower pot cover adapted for providing a decorative cover for a flower pot, comprising:
   a base having an upper end and a lower end with an object opening extending through the upper end and having a plurality of overlapping folds formed in the base for cooperating to provide structural integrity to the base; and
   a skirt connected to the upper end of the base and extending a outwardly from the upper end of the base terminating with an outer peripheral surface, the skirt having a plurality of folds extending from about the upper end of the base outwardly toward the outer peripheral surface of the skirt, a substantial portion of the folds in the skirt generally near the outer peripheral surface being connected and the remaining portions of the folds in the skirt being unconnected.

2. The flower pot cover of claim 1 wherein the overlapping folds in the base substantially are permanently fixed.

3. The flower pot cover of claim 1 wherein the flower pot cover is constructed of a material selected from a group of materials consisting of a man-made organic polymer film, paper, (treated or untreated or combinations thereof), burlap, cloth (natural or synthetic or combinations thereof), denim, foil, cling wrap, or cellophane or combinations thereof.

4. The flower pot cover of claim 1 wherein the base and the skirt each are defined further as having a thickness in a range from less than about 1.0 mil to about 30 mils.

5. The flower pot cover of claim 1 wherein the base and the skirt each are defined further as having a thickness of less than about 6 mils.

6. A flower pot cover adapted for providing a decorative cover for a flower pot, comprising:
   a base having an upper end and a lower end with an object opening extending through the upper end and having a plurality of overlapping folds formed in the base for cooperating to provide structural integrity to the base; and
   a skirt connected to the upper end of the base and extending a outwardly from the upper end of the base terminating with an outer peripheral surface, the skirt having a plurality of folds extending from about the upper end of the base outwardly toward the outer peripheral surface of the skirt, a portion of each of the folds in the skirt generally near the upper end of the base and extending a distance outwardly therefrom being connected and the remaining portions of the folds being unconnected.

7. The flower pot cover of claim 6 wherein the overlapping folds in the base substantially are permanently fixed.

8. The flower pot cover of claim 6 wherein the flower pot cover is constructed of a material selected from a group of materials consisting or a man-made organic polymer film, paper, (treated or untreated or combinations thereof), burlap, cloth (natural or synthetic or combinations thereof), denim, foil, cling wrap, or cellophane or combinations thereof.

9. The flower pot cover of claim 6 wherein the base and the skirt each are defined further as having a thickness in a range from less than about 1.0 mil to about 30 mils.

10. The flower pot cover of claim 6 wherein the base and the skirt each are defined further as having a thickness of less than about 6 mils.

11. A flower pot cover adapted for providing a decorative cover for a flower pot, comprising:
- a base having an upper end and a lower end with an object opening extending through the upper end and having a plurality of overlapping folds formed in the base for cooperating to provide structural integrity to the base; and
- a skirt connected to the upper end of the base and extending a outwardly from the upper end of the base terminating with an outer peripheral surface, the skirt having a plurality of folds extending from about the upper end of the base outwardly toward the outer peripheral surface of the skirt, a portion of each of the folds generally near the outer peripheral surface being connected and a portion of the folds in the skirt generally near the upper end of the flower pot being connected and the remaining portion of the folds in the skirt being unconnected.

12. The flower pot cover of claim 11 wherein the overlapping folds in the base substantially are permanently fixed.

13. The flower pot cover of claim 11 wherein the flower pot cover is constructed of a material selected from a group of materials consisting of a man-made organic polymer film, paper, (treated or untreated or combinations thereof), burlap, cloth (natural or synthetic or combinations thereof), denim, foil, cling wrap, or cellophane or combinations thereof.

14. The flower pot cover of claim 11 wherein the base and the skirt each are deined further as having a thickness in a range from less than about 1.0 mil to about 30 mils.

15. The flower pot cover of claim 11 wherein the base and the skirt each are defined further as having a thickness of less than about 6 mils.

16. A flower pot adapted for holding a floral grouping, comprising:
- a base having an upper end and a lower end with an object opening extending through the upper end and having a plurality of overlapping folds formed in the base for cooperating to provide structural integrity to the base; and
- a skirt connected to the upper end of the base and extending a outwardly from the upper end of the base terminating with an outer peripheral surface, the skirt having a plurality of folds extending from about the upper end of the base outwardly toward the outer peripheral surface of the skirt, a portion of each of the folds in the skirt generally near the outer peripheral surface being unconnected and a portion of the folds in the skirt generally near the upper end of the flower pot being unconnected and the remaining portion of the folds in the skirt being unconnected.

17. The flower pot cover of claim 16 wherein the overlapping folds in the base substantially are permanently fixed.

18. The flower pot cover of claim 16 wherein the flower pot cover is constructed of a material selected from a group of materials consisting of a man-made organic polymer film, paper, (treated or untreated or combinations thereof), burlap, cloth (natural or synthetic or combinations thereof), denim, foil, cling wrap, or cellophane or combinations thereof.

19. The flower pot cover of claim 16 wherein the base and the skirt each are defined further as having a thickness in a range from less than about 1.0 mil to about 30 mils.

20. The flower pot cover of claim 16 wherein the base and the skirt each are defined further as having a thickness of less than about 6 mils.

* * * * *

UNITED STATES PATENT AND TRADEMARK OFFICE
CERTIFICATE OF CORRECTION

PATENT NO. : 5,111,613
DATED : May 12, 1992
INVENTOR(S) : Donald E. Weder, et al.

It is certified that error appears in the above-identified patent and that said Letters Patent is hereby corrected as shown below:

Column 1, line 65, delete the word "Fig" and substitute therefore the word --Figs.-.

Column 2, line 29, after the numeral, 1, add --)--.

Column 4, line 23, delete the word "a".

Column 4, line 57, delete the word "a".

Column 5, line 24, delete the word "a".

Column 6, line 16, delete the word "a".

Signed and Sealed this

Tenth Day of August, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,111,613
DATED : May 12, 1992
INVENTOR(S) : Donald E. Weder, Joseph G. Straeter It is certified that error appears in the above-identified patent and that said Letters Patent is hereby corrected as shown below:

Column 5, line 32, please delete the words "flower pot" and substitute therefore the word --base--.

Column 6, line 8, after pot, please insert the word --cover--.

Column 6, line 24, please delete the words "flower pot" and substitute therefore the word --base--.

Column 6, line 26, delete the word "unconnected" and substitute therefore the word --connected--.

Signed and Sealed this

Fourteenth Day of December, 1993

Attest:

BRUCE LEHMAN

*Attesting Officer*      *Commissioner of Patents and Trademarks*